United States Patent
Detienne et al.

(10) Patent No.: US 9,258,282 B2
(45) Date of Patent: Feb. 9, 2016

(54) SIMPLIFIED MECHANISM FOR MULTI-TENANT ENCRYPTED VIRTUAL NETWORKS

(71) Applicant: Cisco Technology, Inc., San Jose, CA (US)

(72) Inventors: Frederic R. P. Detienne, Harze (BE); Pratima Sethi, Mumbai (IN)

(73) Assignee: Cisco Technology, Inc., San Jose, CA (US)

(*) Notice: Subject to any disclaimer, the term of this patent is extended or adjusted under 35 U.S.C. 154(b) by 185 days.

(21) Appl. No.: 13/659,299

(22) Filed: Oct. 24, 2012

(65) Prior Publication Data

US 2014/0115325 A1    Apr. 24, 2014

(51) Int. Cl.
*H04L 29/06* (2006.01)

(52) U.S. Cl.
CPC ........ *H04L 63/0485* (2013.01); *H04L 63/0209* (2013.01); *H04L 63/0272* (2013.01); *H04L 63/0428* (2013.01)

(58) Field of Classification Search
CPC ..... H04L 63/00; H04L 63/02; H04L 63/0209; H04L 63/04; H04L 63/0428; H04L 63/0471; H04L 63/0272; H04L 63/0485
See application file for complete search history.

(56) References Cited

U.S. PATENT DOCUMENTS

| | | | |
|---|---|---|---|
| 7,107,613 B1* | 9/2006 | Chen et al. | 726/14 |
| 2005/0257039 A1* | 11/2005 | Marshall | 713/1 |
| 2006/0013209 A1* | 1/2006 | Somasundaram | 370/389 |
| 2013/0061034 A1* | 3/2013 | Walheim, Sr. | 713/150 |

* cited by examiner

*Primary Examiner* — Yogesh Paliwal
(74) *Attorney, Agent, or Firm* — Campbell Stephenson LLP

(57) ABSTRACT

The present disclosure provides protection of customer data traveling across a network. A reverse cryptographic map (also referred to herein as a reverse crypto map) can be defined for a customer, where the reverse crypto map indicates how customer data should be protected. A reverse crypto map for a customer is applied to an interface of an edge device that is coupled to that customer's private subnet (or customer-facing interface). A reverse crypto map can be configured by a network administrator on a provider edge device, or can be pushed from a key server as part of group policy. A provider edge device can protect customer data by encrypting and decrypting the customer data according to the reverse crypto map. A provider edge device can also be configured with virtual routing and forwarding (VRF) tables that can be used to forward the VPN traffic flow across a provider network.

21 Claims, 9 Drawing Sheets

SIMPLIFIED MECHANISM FOR MULTI-TENANT ENCRYPTED VIRTUAL NETWORKS

FIELD OF THE INVENTION

This invention relates generally to networking and, more particularly, to protection of data that is transmitted across a network.

BACKGROUND

Encryption schemes, such as a group key based encryption scheme or other cryptographic encryption scheme, can protect a stream of communications (also referred to as a traffic flow) that is transmitted across a network (such as a provider network or a customer network). A traffic flow can also be transmitted across a network via a virtual private network (VPN) or a virtual local area network (VLAN). A VPN and a VLAN can couple two or more private networks via the infrastructure of the network.

BRIEF DESCRIPTION OF THE DRAWINGS

A more complete understanding of the present disclosure may be acquired by referring to the following description and accompanying drawings, in which like references numbers indicate like features.

Figure 1A:
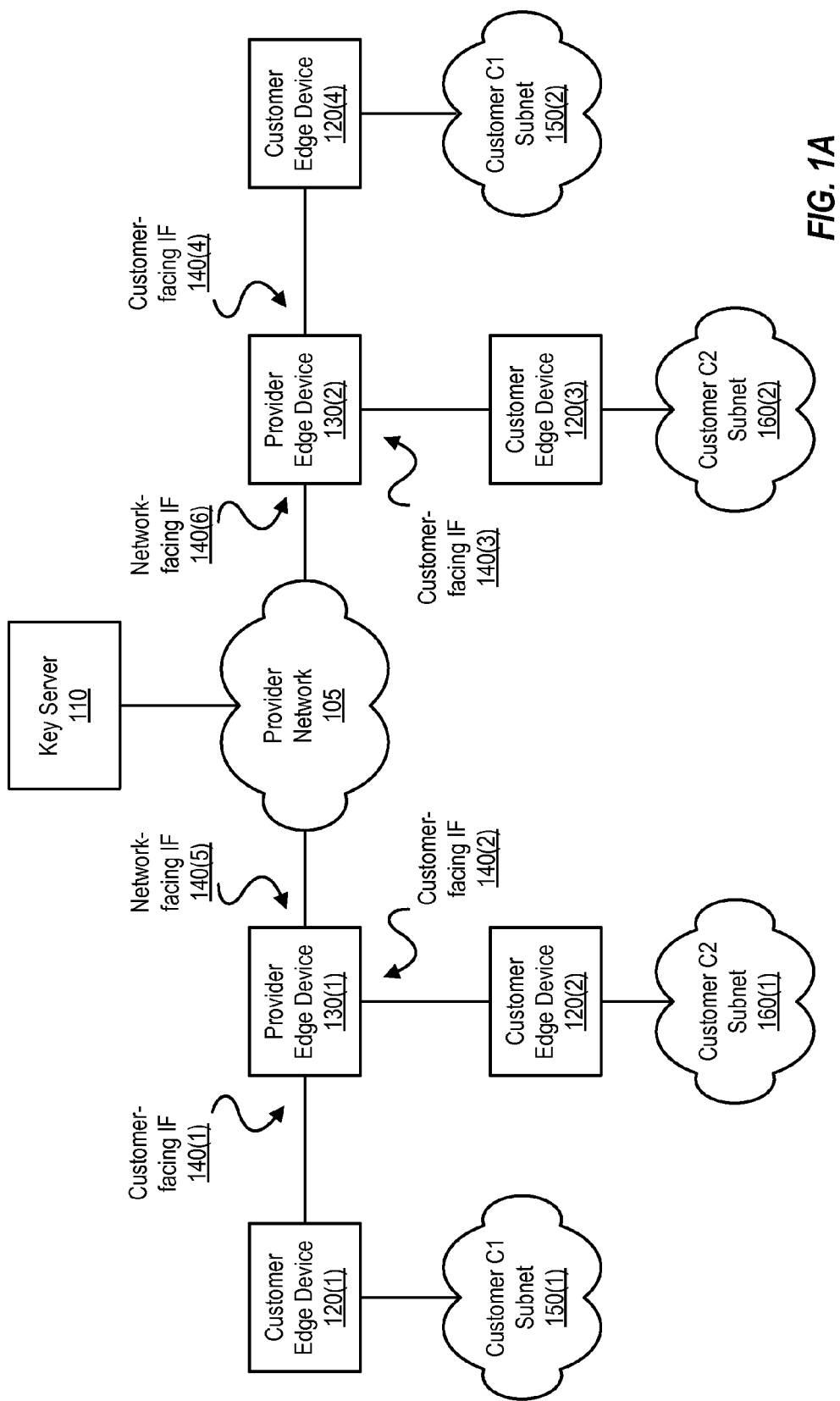
FIGS. 1A and 1B are block diagrams illustrating components of example environments in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

The present disclosure provides protection of customer data traveling across a network. In one embodiment, a security service is implemented by a provider to protect customer virtual private network (VPN) data as it travels from one private subnet of the customer across a provider network (e.g., an MPLS network) to another private subnet of the customer. In such an embodiment, a provider edge device can be coupled to one or more subnets of one or more customers. A reverse cryptographic map (also referred to herein as a reverse crypto map) can be defined for each customer, where the reverse crypto map indicates how VPN data of a customer should be protected. A reverse crypto map for a customer is applied to an interface of the provider edge device that is coupled to that customer's private subnet (also referred to herein as a customer-facing interface). A reverse crypto map can be configured by a network administrator on a provider edge device, or can be pushed from a key server as part of group policy, where the provider edge device is configured as a group member. A provider edge device can protect customer VPN data by encrypting and decrypting the customer VPN data according to the reverse crypto map. A provider edge device can also be configured with virtual routing and forwarding (VRF) tables that can be used to forward the VPN traffic flow across a provider network.

In another embodiment, the present disclosure can be implemented by a customer (e.g., an enterprise) to protect customer virtual local area network (VLAN) data as it travels from one customer edge device across a customer network (e.g., an IP network) to another customer edge device. Various types of data traffic can be transmitted on various dedicated VLANs, such as voice over IP (VOIP) data over a dedicated VOIP VLAN and data traffic over a dedicated data traffic VLAN. In such an embodiment, a customer edge device can be coupled to one or more customer VLANs. A reverse cryptographic map (also referred to herein as a reverse crypto map) can be defined for each VLAN, where the reverse crypto map indicates how the VLAN data should be protected. A reverse crypto map for a VLAN is applied to an interface of the customer edge device that is coupled to that VLAN (also referred to herein as a VLAN-facing interface). The customer edge device can protect VLAN data by encrypting and decrypting the VLAN data according to the reverse crypto map.

EXAMPLE EMBODIMENTS

Figure 1B:
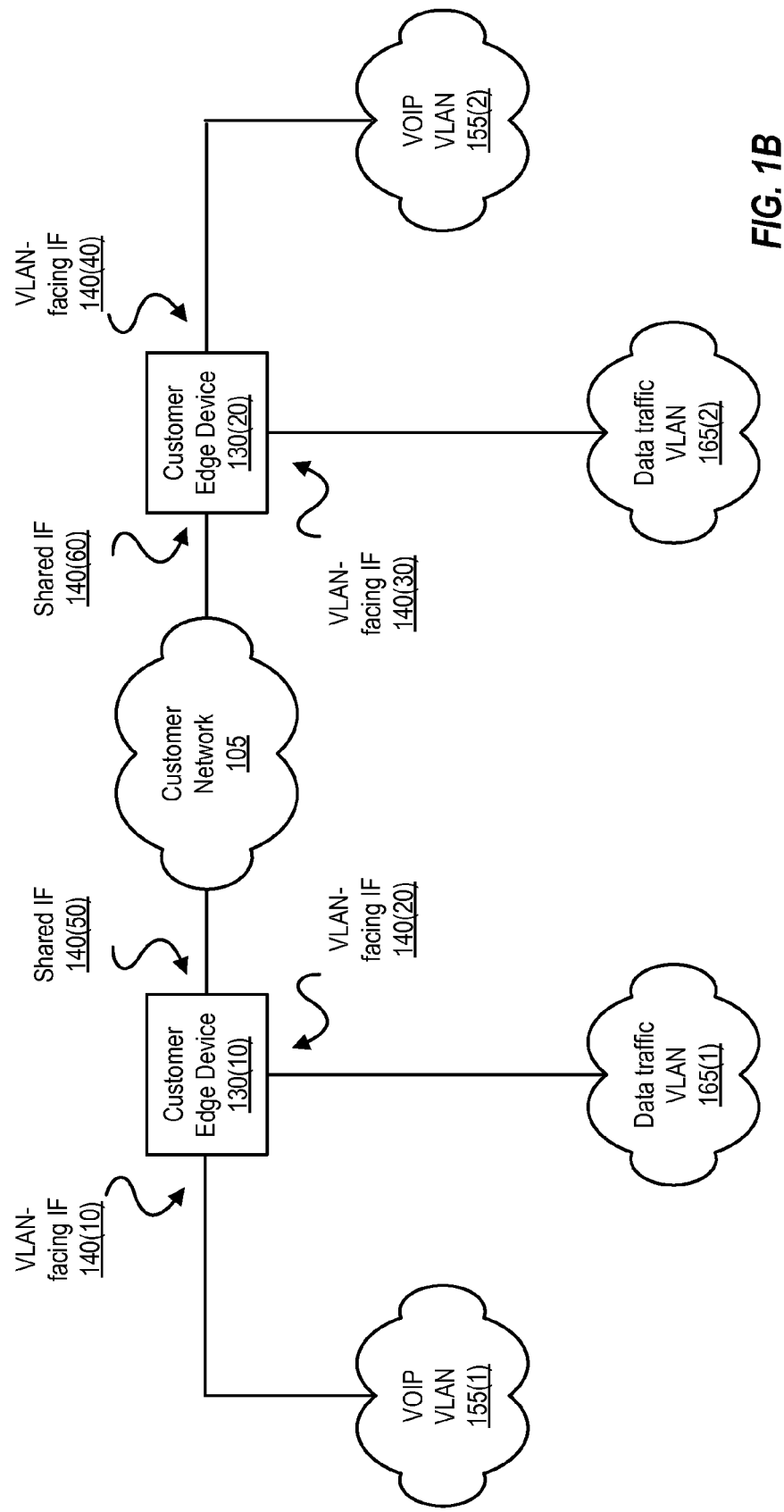

FIGS. 1A and 1B are block diagrams illustrating components of example environments in which the present disclosure can be implemented. FIG. 1A illustrates one example environment including a provider network. FIG. 1B illustrates another environment including a customer network, which is further discussed below.

As illustrated in FIG. 1A, an example environment can include provider network 105. In one embodiment, provider network 105 can be a Multiprotocol Label Switching (MPLS) network. In another embodiment, provider network 105 can be an Internet Protocol (IP) network. In one embodiment, a group key based encryption scheme, such as one implemented using Group Encrypted Transport (GET) virtual private network (VPN), can be implemented in provider network 105. In another embodiment, a cryptographic encryption scheme, such as one implemented using Internet Protocol security (IP sec) protocol, can be implemented in provider network 105.

A group key based encryption scheme can be managed by a key management server, also referred to herein as a key server 110. As shown, the example environment includes various network devices, including key server 110, provider edge devices 130(1) and 130(2), and customer edge devices 120(1)-(4). Provider edge devices 130(1) and 130(2) (also referred to herein as a provider edge device 130) and customer edge devices 120(1)-(4) (also referred to herein as a customer edge device 120) can be routing devices (e.g., routers or network devices that provide routing functionality). An example network device is further illustrated in FIGS. 8 and 9. Provider network 105 communicatively couples key server 110 and provider edge devices 130(1) and 130(2) of FIG. 1A with one another. Provider network 105 can be managed by a service provider (such as an internet service provider), and can provide various services to end users (such as customers C1 and C2, internet users, and other classes of users). Provider network 105 can include both logical (e.g., logical tunnel) and physical links (e.g., physical Ethernet link).

Provider edge devices 130(1) and (2) can be security gateways that serve as access points to customer subnets. In the embodiment shown, provider edge device 130(1) is communicatively coupled to customer edge device 120(1) via customer-facing interface 140(1) and to customer edge device 120(2) via customer-facing interface 140(2). Provider edge device 130(2) is communicatively coupled to customer edge device 120(3) via customer-facing interface 140(3) and to customer edge device 120(4) via customer-facing interface 140(4). Provider edge device 130(1) is also communicatively coupled to provider network 105 via network-facing interface 140(5), and provider edge device 130(2) is also communicatively coupled to provider network 105 via network-facing interface 140(6).

Customer edge device 120(1) is communicatively coupled to a private sub-network (or subnet) 150(1) of customer C1 and customer edge device 120(4) is communicatively coupled to another private subnet 150(2) of customer C1. Customer edge device 120(2) is communicatively coupled to a private subnet 160(1) of customer C2 and customer edge device 120(3) is communicatively coupled to a private subnet 160(2) of customer C2. Thus, provider edge device 130(1) can be a security gateway for customer C1 subnet 150(1) and customer C2 subnet 160(1), and provider edge device 130(2) can be a security gateway for customer C1 subnet 150(2) and customer C2 subnet 160(2). Virtual private networks (VPNs) can be implemented for customers C1 and C2 that communicatively couple remote customer sites using the infrastructure of provider network 105. For example, subnets 150(1) and 150(2) can be part of a customer C1 VPN, and subnets 160(1) and 160(2) can be part of a customer C2 VPN.

In one embodiment, a security service provided by provider network 105 can be used to protect VPN data communicated between customer subnets across provider network 105. Using the group key based encryption scheme implemented in provider network 105, a security group can be established to protect a particular stream of data transmitted across provider network 105, which is also referred to herein as a traffic flow. For example, a C1 VPN security group can be established to protect the traffic flow of the C1 VPN, and a C2 VPN security group can be established to protect the traffic flow of the C2 VPN. Group members of a security group can be configured to protect a VPN traffic flow by encrypting and decrypting packets of the VPN traffic flow, as defined by an encryption policy for the group (also referred to herein as group policy). A network device, such as a customer edge device 120, can be configured to be a group member by registering with key server 110 for a particular security group. A group member can be registered with more than one security group.

Key server 110 supports a plurality of security groups implemented in the provider network 105 by maintaining and distributing group policies and group keys of the plurality of security groups, according to the group key based encryption scheme. Key server 110 maintains a data store such as a database or other data structure (e.g., an access control list) that contains the group policies for all security groups configured in the provider network 105. While at least one key server is needed to perform such functions, more than one key server may be implemented in the network, such as for redundancy (e.g., if a primary key server becomes unavailable, a secondary key server is still available) and load balancing (e.g., responsibility for group members may be divided among the key servers). For example, key server 110 can cooperate with another key server (not shown), where group policies and group keys are synchronized among the cooperative key servers.

In one example implementation of a group key based encryption scheme, customer edge devices 120(1) and 120(4) can be configured as group members of the C1 VPN security group that protects the traffic flow of the customer C1 VPN, such as data transmitted between subnet 150(1) and subnet 150(2). The group members of the C1 VPN security group can receive group policy and group key(s) from key server 110 for this particular security group. A group key can be a randomly generated number used to encrypt and decrypt traffic flows, and can also be referred to as a traffic encrypting key (TEK). Group members of the same security group possess the same group key(s) for the security group.

The group policy can indicate how packets of the C1 VPN traffic flow should be protected by the C1 VPN security group, such as by encrypting and forwarding packets of the traffic flow. For example, group policy implemented on a first group member of the C1 VPN security group (e.g., customer edge device 120(1)) can indicate that clear text packets of the traffic flow from subnet 150(1) should be encrypted into encrypted packets using the group key, and that the encrypted packets should be forwarded securely from an interface of the first group member toward subnet 150(2) (e.g., transmitted to provider edge device 130(1)), via the provider network. After traveling across the provider network 105, a second group member of the C1 VPN security group (e.g., customer edge device 120(4)) can receive the encrypted packets on an interface coupled to provider network 105 (e.g., received from provider edge device 130(2)). Group policy implemented on the second group member can indicate that encrypted packets should be decrypted into clear text packets using the same group key, and that the clear text packets should be forwarded from an interface of the second group member to subnet 150(2).

The service provider is responsible for managing the group key based encryption scheme in order to ensure that traffic flows of multiple customers are properly protected and transmitted across the provider network 105. If encryption/decryption of a traffic flow occurs at a customer edge device (e.g., customer edge device 120) that is configured as a group member, the service provider also needs to manage that customer edge device to ensure compliance with the group key based encryption scheme. Such management can add complexity to the customer-service provider relationship. For example, a customer that wishes to use the security service provided by the service provider may be required to use equipment obtained from the service provider, where the equipment is configured to comply with the group key based encryption scheme and can be used as a customer edge device. Further, a service provider may not be able to fully manage a customer edge device, for example, if the device is unable to communicate with provider network 105 or if the customer manages the device. In such scenarios, the device may require configuration, which can be complex and beyond the expertise of the customer, especially considering that such configuration also needs to comply with the service provider configuration, with which the customer may not be familiar. Thus, the customer may be without service until repair or replacement of the device is performed.

The present disclosure provides for performing encryption/decryption of a traffic flow at a provider edge device (e.g., provider edge device 130) that has been configured with a reverse cryptographic map (also referred to herein as a reverse crypto map). In one embodiment, the provider edge device is configured to be a group member of the security group protecting a VPN traffic flow, and receives a reverse crypto map as part of group policy for the security group. In another embodiment, the provider edge device is configured with a reverse crypto map by a network administrator, without requiring the provider edge device to play a role in a group key based encryption scheme. Also, as shown in FIG. 1B, a customer edge device, such as a customer IP router, in a customer environment can be configured with a reverse crypto map in a manner similar to the provider edge device, as further discussed herein.

Performing encryption/decryption at a provider edge device simplifies the customer-service provider relationship. Encryption and decryption of packets can be performed at an interface of the provider edge device that is coupled to a customer edge device (e.g., customer edge device 120), also referred to as a customer-facing interface of the provider edge device. The present disclosure reduces complexity in the customer edge device configuration, reduces the number of devices that need to be managed by the service provider, and allows the service provider full management of all group members. Reducing the number of customer edge devices also reduces implementation and deployment costs. Also, reducing the number of customer edge devices can improve security of the customer VPN, since fewer customer edge devices have access to the group key and policy (in such a scenario, if the customer edge device is compromised, the entire customer VPN is compromised).

Performing encryption and decryption at a customer-facing interface of the provider edge device rather than at the customer edge device can be beneficial for customers who have sufficient trust in the link between the customer edge device and the provider edge device (e.g., the customer edge device and provider edge device are collocated, such as located on the service provider's premises), or who have other cryptographic methods to protect the link between the customer edge device and the provider edge device (e.g., IEEE 802.1X (Dot1x) protocol, Internet Protocol Security (IPsec) protocol). Further, performing encryption and decryption at a customer-facing interface of the provider edge device 130 is simpler to implement, as compared to the complex configuration required for performing encryption/decryption at a network-facing interface of the provider edge device, since the network-facing interface is shared among all the customers coupled to provider edge device. Such complex configuration can risk mis-configuration of the network-facing interface, affecting connections of the other customers that use services provided via provider edge device.

Additionally, since the network-facing interface of the provider edge device is shared among all customers coupled to provider edge device, the network-facing interface has historically been a featureless interface. For example, if the provider network is an MPLS network, a security service or other IP-level features have not been offered or configured on the network-facing interface. Implementing the present disclosure can enable a provider edge device to provide features like a security service over the MPLS network-facing interface by augmenting the forwarding path of a corresponding customer-facing interface of the provider edge device using a reverse cryptographic map (or reverse crypto map), without needing to augment the network-facing interface, as further discussed below.

The present disclosure also provides for different implementations of a group key based encryption scheme in a provider environment like that shown in FIG. 1A, which include (1) customer edge (CE) devices configured as group members (discussed above), (2) provider edge (PE) devices configured as group members (discussed below), and (3) a hybrid implementation where both customer edge devices and provider edge devices are configured as group members (discussed below).

Throughout this disclosure, the term "packet" is used to refer to a logical grouping of information sent as a data unit over a transmission medium. Packets may include header and/or trailer information that surrounds user data contained in the data unit. For purposes of this disclosure, a "packet" may include a cell, datagram, frame, message, segment, or any other logical group of information.

In some embodiments, key server 110 can implement group key management protocols, such as Group Domain of Interpretation (GDOI) or Group Secure Association Key Management Protocol (GSAKMP). It is noted that other embodiments can include different numbers and arrangement of key servers, network devices, and customer networks than are shown in this example. For example, an alternative embodiment can include additional key servers (e.g., cooperative key servers), significantly more network devices than are shown in the illustrated example (e.g., additional provider edge devices, provider core devices, customer edge devices, and/or customer core devices), and/or significantly more customer subnets.

FIG. 1B illustrates another example environment including a customer network, which can include customer network 105. In one embodiment, customer network 105 can be an MPLS network. In another embodiment, customer network 105 can be an IP network. In one embodiment, a group key based encryption scheme, such as one implemented using GET VPN, can be implemented in customer network 105. In another embodiment, a cryptographic encryption scheme, such as one implemented using IPsec protocol, can be implemented in customer network 105.

As illustrated in FIG. 1B, the example environment includes various network devices, including customer edge devices 130(10) and 130(20) and customer switches 140(10)-(40). Customer edge devices 130(10) and 130(20) can be routing devices (e.g., routers or network devices that provide routing functionality). An example network device is further illustrated in FIGS. 8 and 9. Customer network 105 communicatively couples customer edge devices 130(10) and 130(20) of FIG. 1B with one another. Customer network 105 can be managed by a customer (such as an enterprise), and can include both logical (e.g., logical tunnel) and physical links (e.g., physical Ethernet link).

In the embodiment shown, customer edge device 130(10) is communicatively coupled to a first portion of a voice over IP (VOIP) VLAN 155(1) via VLAN-facing interface 140(10) and to a first portion of a data traffic VLAN 165(1) via VLAN-facing interface 140(20). Customer edge device 130(20) is communicatively coupled to a second portion of VOIP VLAN 155(2) via VLAN-facing interface 140(30) and to a second portion of data traffic VLAN 165(2) via VLAN-facing interface 140(40). Customer edge device 130(10) is also communicatively coupled to customer network 105 via shared interface 140(50), and customer edge device 130(20) is communicatively coupled to customer network 105 via shared interface 140(60).

VOIP VLAN 155 is dedicated to carrying VOIP traffic, and data traffic VLAN 165 is dedicated to carrying all other data traffic. VOIP VLAN 155 and data traffic VLAN 165 are managed by different administrators. VOIP VLAN portions 155(1) and 155(2) can be communicatively coupled using the infrastructure of customer network 105, and data traffic VLAN portions 165(1) and 165(2) can be communicatively coupled using the infrastructure of customer network 105.

The present disclosure provides for performing encryption/decryption of a traffic flow at a customer edge device that has been configured with a reverse cryptographic map (also referred to herein as a reverse crypto map). In one embodiment, the customer edge device is configured to protect a VLAN traffic flow using a reverse crypto map, which can be configured on the customer edge device by a network administrator.

In one example implementation of a cryptographic encryption scheme, customer edge devices 130(10) and 130(20) can be configured as peers to protect the traffic flow of the VOIP VLAN, such as traffic transmitted between VOIP VLAN portions 155(1) and 155(2). Customer edge device 130(10) can negotiate with customer edge device 130(2) for a cryptographic policy and cryptographic key(s) for this particular traffic flow. A crypto key can be a randomly generated number used to encrypt and decrypt traffic flows, and can also be referred to as a traffic encrypting key (TEK). A cryptographic policy can include a reverse crypto map.

The crypto policy and reverse crypto map can indicate how packets of the VOIP VLAN traffic flow should be protected, such as by encrypting and forwarding packets of the traffic flow. For example, crypto policy implemented on a peer (e.g., customer edge device 130(10)) can indicate that clear text packets of the traffic flow from VOIP VLAN portion 155(1) should be encrypted into encrypted packets using the crypto key, and that the encrypted packets should be forwarded securely from an interface of the first peer toward portion 155(2) (e.g., transmitted to customer edge device 130(20)), via customer network 105. After traveling across the customer network, a second peer (e.g., customer edge device 130(20)) can receive the encrypted packets on an interface coupled to customer network (e.g., received from customer edge device 130(10)). Encryption policy implemented on the second peer can indicate that encrypted packets should be decrypted into clear text packets using the same crypto key, and that the clear text packets should be forwarded from an interface of the second peer to portion 155(2) (e.g., to a customer switch coupled to VLAN-facing interface 140(40)).

Figure 2A:
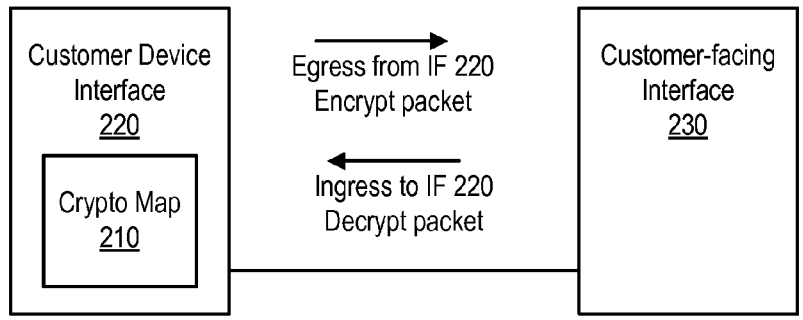
FIGS. 2A and 2B are block diagrams illustrating example transmission paths of packets between a customer edge device and a provider edge device, according to one embodiment.
Figure 2B:
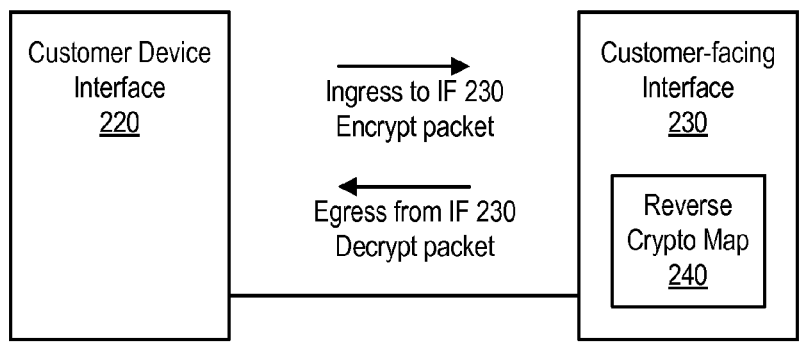

FIGS. 2A and 2B are block diagrams illustrating example transmission paths of packets between a customer edge device and a provider edge device, such as between customer edge devices 120(1)-(4) and provider edge devices 130(1)-(2) as shown in FIG. 1A. Customer device interface 220 (e.g., an interface of customer edge device 120) can be directly coupled to customer-facing interface 230 (e.g., an interface of provider edge device 130).

FIG. 2A illustrates a first example of transmission paths, such as between customer edge device 120(1) and provider edge device 130(1) of FIG. 1A. In the first example, customer edge device 120(1) is a group member of the C1 VPN security group and encryption/decryption is performed on customer device interface 220 of customer edge device 120(1). In the embodiment shown in FIG. 2A, a cryptographic map 210 (also referred to as a classic or standard crypto map 210) is applied to, or configured on, customer device interface 220. The crypto map 210 can be used to identify packets of a protected traffic flow and can indicate how the packets of the traffic flow should be protected, depending on the transmission path direction of the traffic flow. For example, in a group key based encryption scheme, a crypto map 210 associates the security group (e.g., the C1 VPN security group) with the traffic flows (e.g., C1 VPN traffic flow) that are protected by the security group, and thus indicates that the C1 VPN traffic flow should be encrypted using a group key of the C1 VPN security group. Customer edge device 120(1) can receive a packet from customer subnet 150(2) and forward the packet to customer device interface 220, which is the interface coupled to provider edge device 130(1). At customer device interface 220, the crypto map 210 can indicate that packets of the protected traffic flow (e.g., C1 VPN traffic flow) that leave (or egress from) customer device interface 220 toward customer-facing interface 230 of the provider edge device 130(1) should be encrypted. Crypto map 210 can also indicate that packets of the protected traffic flow (e.g., C1 VPN traffic flow) that enter (or ingress to) customer device interface 220 from customer-facing interface 230 should be decrypted. The crypto map 210 can also indicate that packets that are not part of a protected traffic flow should be dropped or should be forwarded.

FIG. 2B illustrates a second example of transmission paths, such as between customer edge device 120(1) and provider edge device 130(1) of FIG. 1A. In the second example, provider edge device 130(1) is a group member of the C1 VPN security group and encryption/decryption is performed on provider edge interface 230 of provider edge device 130(1). In this example, customer edge device 120(1) is not a group member of C1 VPN security group and does not play a role in the group key based encryption scheme.

In the embodiment shown in FIG. 2B, a reverse cryptographic map 240 (also referred to as a reverse crypto map 240) is applied to, or configured on, customer-facing interface 230 of provider edge device 130(1). A reverse crypto map 210 can be a crypto map 210 that is associated with a "reversed" identifier. The reverse crypto map 240 maintains the same transmission path direction as the crypto map 210 (e.g., a traffic flow that is described as having a transmission path direction from A to B in crypto map 210 will also be described as having a transmission path direction from A to B in reverse crypto map 240). Since the same transmission path directions are maintained, group policy does not need to be modified or adapted for a reverse crypto map 240. The group policy is compatible with both crypto map 210 and reverse crypto map 240. Thus, the same group policy can be received and implemented by all group members of the security group, where the group members are ones of provider edge devices and customer edge devices. For example, different implementations of a group key based encryption scheme can include (1) customer edge (CE) devices configured as group members (discussed above), (2) provider edge (PE) devices configured as group members (further discussed below), and (3) a hybrid implementation that includes both customer edge devices and provider edge devices configured as group members. In such a hybrid implementation, a traffic flow can be protected between PE devices (e.g., PE to PE), between CE devices (e.g., CE to CE), and between a PE device and a CE device (e.g., PE to CE, or CE to PE).

Like crypto map 210, reverse crypto map 240 can be used to identify packets of a protected traffic flow and can indicate how the packets of the traffic flow should be protected, depending on the transmission path direction of the traffic flow. For example, in a group key based encryption scheme, reverse crypto map 240 associates the security group (e.g., the C1 VPN security group) with the traffic flows (e.g., C1 VPN traffic flow) that are protected by the security group, and thus indicates the C1 VPN traffic flow should be encrypted using a group key of the C1 VPN security group. A traffic flow can be described using origination and destination points of the traffic flow, such as IP addresses, network prefixes, or specific port numbers. The reverse crypto map 240 can indicate that packets of the protected traffic flow (e.g., C1 VPN traffic flow) that enter (or ingress to) provider edge interface 230 from customer edge interface 220 should be encrypted. Reverse crypto map 240 can also indicate that packets of the protected traffic flow (e.g., C1 VPN traffic flow) that leave (or egress from) provider edge interface 230 to customer edge interface 220 should be decrypted. Thus, implementation of a reverse crypto map 240 reverses the encryption and decryption operations for the ingress and egress transmission path directions. The reverse crypto map 240 can also indicate that packets that are not part of a protected traffic flow should be dropped or forwarded according to information in the packet's IP header.

FIG. 2B can also be interpreted as illustrating transmission paths between a customer edge device and a customer VLAN, such as between customer edge devices 130(10)-(40) and VLANs 155 and 165 of FIG. 1B. Customer-facing interface 230 of FIG. 2B can be viewed as a VLAN-facing interface, such as VLAN-facing interface 140(10) and 140(20) of customer edge device 130(10) of FIG. 1B. Customer device interface 220 can be viewed as an interface of a customer device of a customer VLAN, such as a customer switch of VOIP VLAN 155(1) or data traffic VLAN 160(1), which is coupled to customer-facing/VLAN-facing interface 230. Thus, a reverse crypto map 240 can be configured on VLAN-facing interfaces 140, in the manner described above with respect to customer-facing interface 230.

Figure 3:
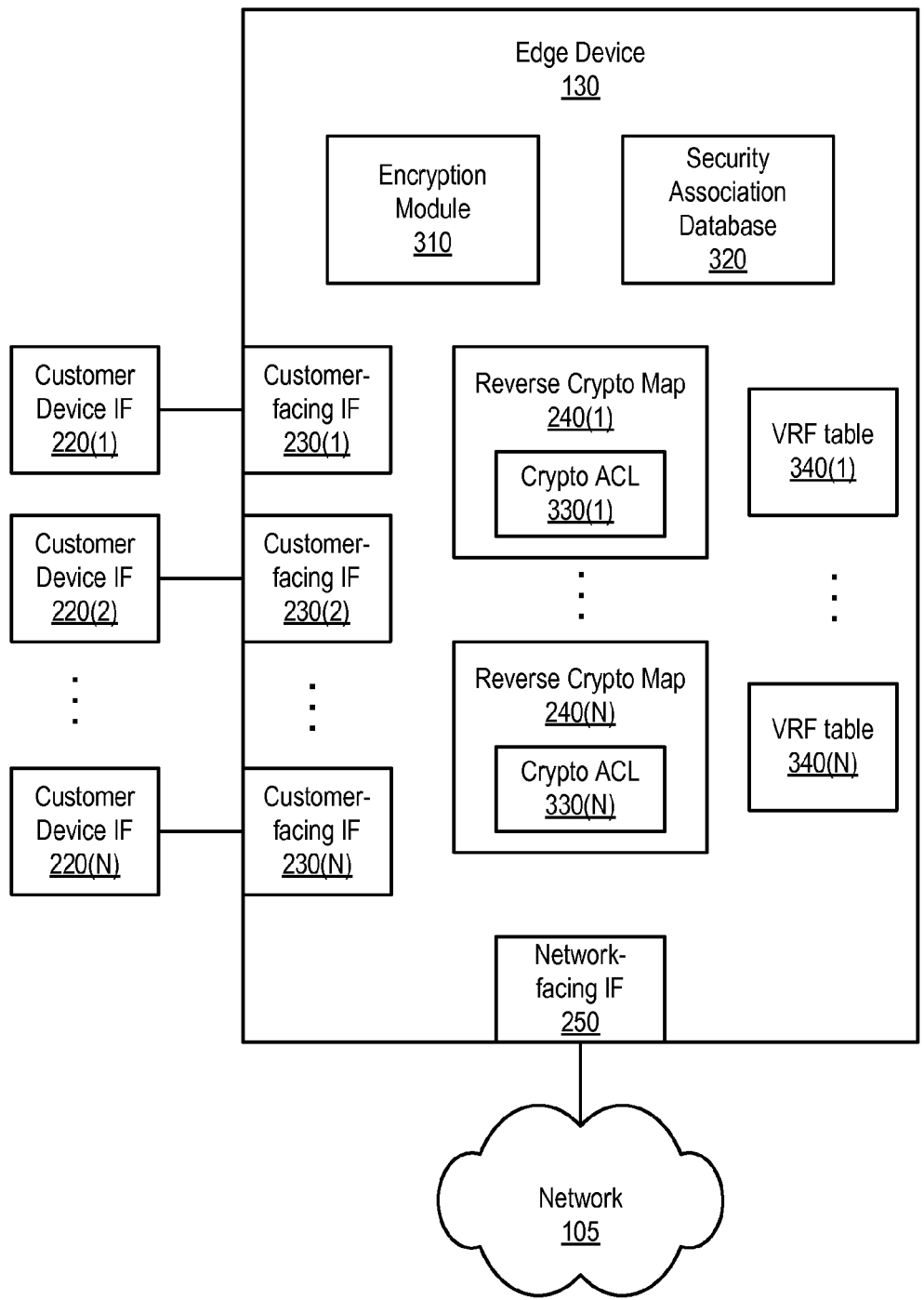
FIG. 3 is a block diagram illustrating components of an example edge device in which the present disclosure can be implemented, according to one embodiment.

FIG. 3 is a block diagram illustrating components of an example edge device 130 (e.g., provider edge devices 130(1)-(2) of FIG. 1A and customer edge devices 130(10)-(20) of FIG. 1B) that is configured to perform encryption and decryption of customer traffic flows using one or more reverse crypto maps. Edge device 130 can include a plurality of interfaces 230(1)-(N) that are each coupled to one of a plurality of customer device interfaces 220(1)-(N). Since interfaces 230 are coupled to one or more customer device interfaces 220, interfaces 230 are referred to as customer-facing interfaces 230. Each customer-facing interface 230 can be coupled to a customer edge device (such as customer edge device 120 of FIG. 1A) or to a customer device (such as a customer switch of a customer VLAN of FIG. 1B) via a customer edge interface 220. For example, customer edge device 120(1) of customer C1 can be coupled to customer-facing interface 230(1) of provider edge device 130(1), and customer edge device 120(2) of customer C2 can be coupled to customer-facing interface 230(2) of provider edge device 130(1), as shown in FIG. 1A. Edge device 130 also includes at least one interface 250 coupled to network 105 (e.g., a provider network or a customer network), which is also referred to herein as a network-facing interface 250. Although one interface is shown as being coupled to the network 105, multiple interfaces of edge device 130 can be coupled to the network 105.

Edge device 130 also includes an encryption module 310. If edge device 130 is configured as a group member, encryption module 310 can be configured to register the edge device 130 with key server 110 as a group member that will protect the VPN traffic of the customer. During registration, the key server can verify the identity and authentication credentials (e.g., using a pre-shared key or digital certificate issued by a certificate authority) of the edge device. Once the edge device 130 is successfully registered with a security group, encryption module 310 can receive the group policy and group key(s) from key server 110 that are used to encrypt and decrypt traffic flow(s). Encryption module 310 can configure the edge device 130 with the group policy. A group member can be a member of a plurality of security groups, and can receive a group policy and group key(s) for each security group in which the group member is registered. Encryption module 310 can also provide the logic for performing the encryption/decryption of packets, as described in FIGS. 6 and 7.

Edge device 130 also includes a security association (SA) database 320 that stores information about any security associations formed between edge device 130 and other devices. If a group key based encryption scheme is implemented, each group shares the same set of SAs (also referred to as group SAs) and group key(s) among group members of the group. If a group key based encryption scheme is not implemented, encryption module 310 can set up security associations with other devices (e.g., peers) that will be used to encrypt the packets of a protected traffic flow using crypto key(s). Each SA can be uniquely identified using a security parameter index (or SPI), a destination IP address (e.g., an IP address of the destination customer subnet or endpoint in the destination customer subnet), and an identifier of the IPsec protocol used (e.g., ESP). The set of information including the SPI, the destination IP address, IPsec protocol, and key(s) (e.g., group keys or crypto keys) can be stored as SA parameters of a security association in SA database 320 on edge device 130. Two unidirectional SAs are needed to protect bi-directional traffic flow (one in each direction). SA parameters must match on the pair of devices (e.g., pair of group members or pair of peers) that are communicating customer data.

Edge device 130 can be configured with a plurality of reverse crypto maps 240(1)-(N), one for each customer that wishes to use the security service provided by the provider network via edge device 130. Each of the plurality of reverse crypto maps 240 can be applied to (or configured on) one of customer-facing interfaces 230(1)-(N). In one embodiment, edge device 130 is configured with reverse crypto map 240 that is included in group policy pushed from the key server (e.g., reverse crypto map 240 is created and configured at the key server). In one embodiment, reverse crypto map 240 can be configured on edge device 130 by a network administrator (e.g., reverse crypto map 240 is created and configured at the provider edge device). In one embodiment, a default reverse crypto map 240 can be created by a network administrator on edge device 130, and configured on edge device 130 with information (e.g., a crypto ACL 330) that is pushed by the key server with the group policy.

Each reverse crypto map 240 includes a crypto access control list (ACL) 330. The crypto ACL 330 can include entries that describe a traffic flow that should be protected (e.g., C1 VPN traffic flow), and thus the reverse crypto map 240 can be used to identify packets of a protected traffic flow. In a group key based encryption scheme, configuring a reverse crypto map 240 (such as by configuring the corresponding crypto ACL 330) associates the security group (e.g., C1 VPN security group) with the traffic flow that should be protected by the security group (e.g., C1 VPN traffic flow). Each customer-facing interface 230 can be associated with a reverse crypto map 240 (e.g., a reverse crypto map 240 is applied to each customer-facing IF 230). Thus, a customer that is associated with one of the plurality of customer-facing interfaces 230(1)-(N) is also associated with one of the plurality of reverse crypto maps 240(1)-(N). Configuration of a reverse crypto map 240 and crypto ACL 330 is further described in reference to FIG. 5.

In one embodiment, edge device 130 can also be configured with a plurality of virtual routing and forwarding (VRF) tables 340(1)-(N). In another embodiment, a standard routing table can be used to forward packets. VRF tables 340 allow multiple routing tables to exist on a single edge device 130, one VRF table for each customer VPN or VLAN implemented on the edge device 130. Thus, multiple customers can share the same infrastructure of the network (e.g., customers C1 and C2 share provider edge devices 130(1) and (2) of provider network 105), while customer VPN (and VLAN) traffic flows are isolated from each other. Each VRF table can include forwarding information used to forward packets of a particular traffic flow. For example, packets of C1 VPN traffic flow can be forwarded using a VRF table 340(1) associated with the C1 VPN, and packets of C2 VPN traffic flow can be forwarded using a VRF table 340(2) associated with the C2 VPN. Each customer-facing interface 230 can be associated with at least one virtual routing and forwarding (VRF) table 340, as described in reference to FIG. 6. Thus, a customer that is associated with one of the plurality of customer-facing interfaces 230(1)-(N) is also associated with at least one of the plurality of VRF tables 340(1)-(N). The information in the VRF tables 340 are updated via a routing protocol, such as Border Gateway Protocol (BGP), which communicates routing and forwarding information about a customer VPN to edge device 130.

The letter N is used to indicate a variable number of devices or components. For example, a variable number of customer edge devices and provider edge devices are implemented in the system. Although the letter N is used in describing a variable number of instances of each of these different devices and components, a repeated use of the letter N does not necessarily indicate that each device and component has a same number of N instances implemented in the system.

Figure 4:
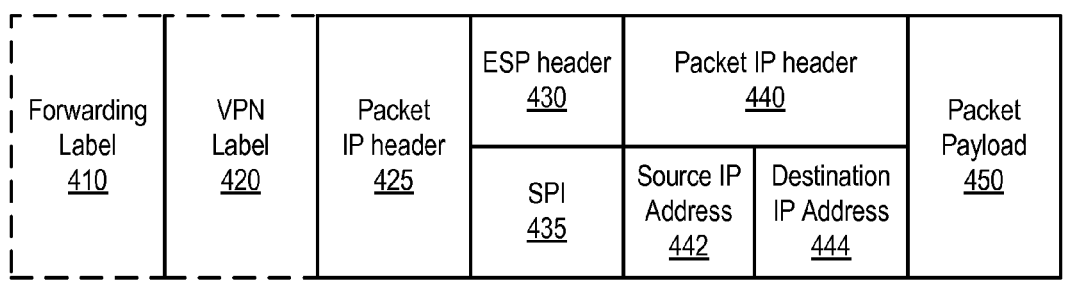
FIG. 4 is a block diagram illustrating components of an example encryption format for packets transmitted through a network, according to one embodiment.

FIG. 4 is a block diagram illustrating components of an example encryption format for packets transmitted through a network. A clear text packet can include packet IP header 440 and packet payload 450. Packet IP header 440 can include a source IP address 442 and a destination IP address 444 of the packet. The packet payload 450 can include packet data. The clear text packet can be encrypted using a group key of the security group and encapsulated using an IP security (IPsec) protocol, such as encapsulated security protocol (ESP). The packet can be encapsulated with an ESP header 430, which can include a security parameter index (SPI) 435 that can be used to identify a security association that was used to encrypt and transmit the packet (discussed in further detail below). The original packet IP header 440 can also be copied and appended to the encapsulated packet as packet IP header 425. At this point, the packet format including IP header 425, ESP header 430, IP header 440, and packet payload 450 can be used to transmit a packet in an IP network.

In order to transmit the packet in an MPLS network from a provider edge device, the packet format also includes a forwarding label 410 and a VPN label 420 that are appended to the packet. The forwarding label 410 can be used to label switch the packet across the provider MPLS network. The VPN label 420 can be used by a receiving provider edge device to identify the destination customer VPN of the packet. Once received by the receiving provider edge device, the VPN label (and the forwarding label, if not yet removed) can be removed or popped, the ESP header of the packet can be decapsulated, and the packet can be decrypted, resulting in the clear text packet.

Figure 5:
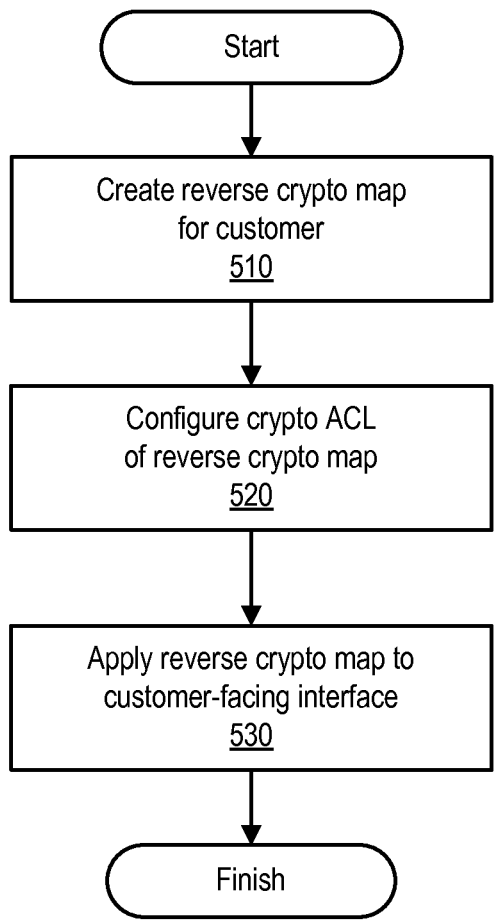
FIG. 5 is a flowchart illustrating operations of an example configuration process for an edge device, according to one embodiment.

FIG. 5 is a flowchart that illustrates operations of an example configuration process for an edge device 130. The process illustrated in FIG. 5 creates a reverse crypto map and applies the reverse crypto map to a customer-facing interface on an edge device (e.g., a provider edge device 130 of FIG. 1A) or to a VLAN-facing interface on an edge device (e.g., a customer edge device 130 of FIG. 1B). The process illustrated in FIG. 5 can be repeated for each customer or VLAN coupled to the edge device. Each customer-facing interface of an edge device can be coupled to a subnet of a single customer, and a single reverse crypto map for the respective customer can be applied to (or configured on) the respective customer-facing interface. Similarly, each VLAN-facing interface of an edge device can be coupled to a single VLAN, and a single reverse crypto map for the VLAN can be applied to (or configured on) the respective VLAN-facing interface.

The process starts at operation 510, where a reverse crypto map is created for a customer coupled to an edge device. In another embodiment, the reverse crypto map is created for a particular VLAN of a customer coupled to an edge device. In one embodiment, the reverse crypto map can be created on a key server by a network administrator and pushed to an edge device from a key server (e.g., as part of group policy for the security group) after the edge device has successfully registered with the key server. In another embodiment, the reverse crypto map can be created by a network administrator on an edge device. The reverse crypto map includes a crypto ACL, which describes the traffic flow(s) that should be protected by the edge device. Thus, the reverse crypto map identifies the traffic flow(s) protected by the edge device.

The process then continues to operation 520, where the crypto ACL of the reverse crypto map is configured. In one embodiment, the crypto ACL is configured using information pushed from a key server to the edge device. In another embodiment, the crypto ACL is configured by a network administrator on the edge device. The crypto ACL is configured to protect one or more traffic flows by including ACL entries that describe the protected traffic flow, such as using origination and destination points of a traffic flow (e.g., IP addresses, network prefixes, and/or specific port numbers). For example, the VPN traffic flow for customer C1 can be protected using two crypto ACL entries (or ACEs): one entry that describes the traffic flow from subnet 150(1) to subnet 150(2), and another entry that describes the traffic flow from subnet 150(2) to subnet 150(1). An example crypto ACL for customer C1 would be (using IP addresses for the subnets):

| 1 | permit | subnet150(1) | subnet150(2) |
| 2 | permit | subnet150(2) | subnet150(1) |

Similarly, an example crypto ACL 330 for customer C2 would be:

| 1 | permit | subnet160(1) | subnet160(2) |
| 2 | permit | subnet160(2) | subnet160(1) |

In another example, VOIP VLAN traffic flow can be protected using two ACEs: one entry describing the traffic flow from VLAN portion 155(1) to portion 155(2), and vice versa.

Additional ACEs can be included in a crypto ACL for each additional traffic flow protected by the edge device. For example, if C1 VPN were to include a third subnet (not shown), an ACE describing the traffic flow from subnet 150 (1) to the third subnet and an ACE describing the traffic flow from the third subnet to subnet 150(1) could be added to the crypto ACL of the reverse crypto map associated with customer C1 (e.g., the reverse crypto map applied to or configured on the customer-facing interface that is coupled to C1's subnet 150(1)).

Additional ACEs can be incorporated into the local copy of the crypto ACL on the edge device. If the crypto ACL is maintained at the key server, any changes to the crypto ACL can be made by a network administrator at the key server and can be distributed to the group members. If the crypto is statically configured at the edge device, changes to the crypto ACL can be made by a network administrator at the edge device. Although not shown, operation 520 can also include creating and/or configuring one or more VRF tables for one or more customers on the edge device.

The process continues to operation 530, where the reverse crypto map is applied to a customer-facing interface of the edge device. In another embodiment, the reverse crypto map is applied to a VLAN-facing interface of the edge device. Once the crypto ACL is applied to a customer-facing interface or VLAN-facing interface, the edge device can begin protecting the traffic flow(s) identified in the crypto ACL. The reverse crypto map can be used to encrypt and decrypt packets of the protected traffic flow(s), depending on the direction of the packets. The process then ends.

Figure 6:
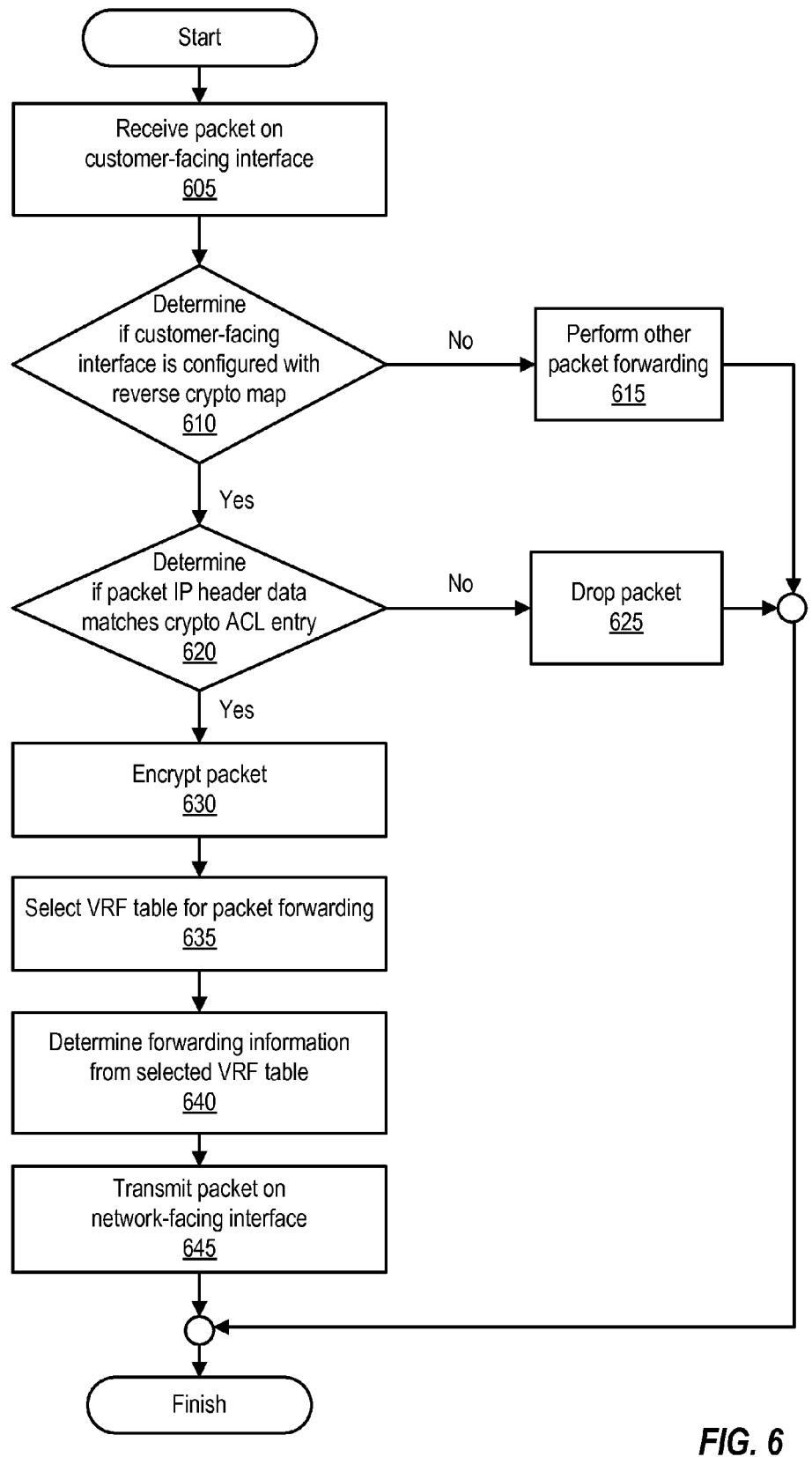
FIG. 6 is a flowchart illustrating operations of an example ingress transmission process implemented by an edge device, according to one embodiment.

FIG. 6 is a flowchart illustrating operations of an example ingress transmission process implemented by an edge device 130. As shown in FIG. 2, a packet follows an ingress transmission path as the packet enters customer-facing interface 230 from customer device interface 220. An example ingress transmission path can also be seen in FIG. 1A from customer edge device 120(1) to provider edge device 130(1), which can be part of the transmission path from subnet 150(1) to subnet 150(2). Another example ingress transmission path can be seen in FIG. 1B from VOIP VLAN 155(1) to customer edge device 130(10), which can be part of the transmission path from VOIP VLAN 155(1) to VOIP VLAN 155(2).

The process illustrated in FIG. 6 begins at operation 605, receiving a packet on a customer-facing interface of an edge device, where the customer-facing interface is communicatively coupled to a (local) customer subnet (e.g., the customer-facing interface of the edge device is coupled to a customer edge device that in turn is coupled to a customer subnet). In another embodiment, the packet is received on a VLAN-facing interface that is communicatively coupled to a (local) portion of a particular VLAN. A customer-facing interface and a VLAN-facing interface can be a physical interface, such as a port, or can be a logical interface, such as a virtual port associated with a physical interface. In one embodiment, the packet is a clear text packet received from a customer edge device of the (local) customer subnet or a customer device (e.g., customer switch) of the portion of the particular VLAN.

The process continues to operation 610, where the edge device determines whether the customer-facing interface (or VLAN-facing interface) on which the packet is received is configured with a reverse crypto map. For example, a reverse crypto map identifier that is associated with the customer-facing interface (or VLAN-facing interface) can indicate that a reverse crypto map is applied to, or configured on, the customer-facing interface (or VLAN-facing interface). If the customer-facing interface (or VLAN-facing interface) is not configured with a reverse crypto map, the process continues to operation 615, where the edge device performs other packet forwarding. Since a reverse crypto map is not configured on the customer-facing interface, another forwarding scheme is used by the edge device to forward the packet that was received on the customer-facing interface (or VLAN-facing interface). For example, in a provider environment like that shown in FIG. 1A, a classic crypto map could be configured on a customer edge device coupled to the customer-facing interface, where the forwarding scheme indicates that a received packet needs to be forwarded according to the packet's IP header (e.g., the edge device should forward the packet to the network). In one embodiment, such a forwarding scheme can include dropping all packets (or forwarding packets in the clear) that are received on the customer-facing interface (or VLAN-facing interface). The process then ends.

Returning to operation 610, if the customer-facing interface (or VLAN-facing interface) is configured with a reverse crypto map, the process continues to operation 620, where the edge device determines whether the packet's IP header data matches a crypto ACL entry of the reverse crypto map. The packet's IP header includes a source IP address and a destination IP address, which are compared to the origination and destination points (e.g., IP addresses or network prefixes) of the entries in the crypto ACL (also referred to an ACL entry or an ACE) of the reverse crypto map. If the packet's source IP address and destination IP address do not match any ACEs, the process continues to operation 625, where the edge device drops the packet. In one embodiment, operation 625 can include forwarding the packet (in the clear) according to the packet's IP header. The process then ends.

Returning to operation 620, if the packet's source and destination IP addresses match an ACE's origination and destination points (e.g., IP addresses or network prefixes), the packet is determined to be part of a customer traffic flow that is protected by the edge device (e.g., C1 VPN traffic flow that is protected by provider edge device 130, or VOIP VLAN 155 protected by customer edge device 130), and the process continues to operation 630, where the edge device encrypts the packet. Since the packet is part of a protected traffic flow, the packet should be encrypted before being transmitted to another edge device (e.g., a group member or peer) toward the destination (e.g., customer subnet or VLAN) via the network (e.g., provider network or customer network). The edge device can look up the SA parameters in the security association database that will be used to send the packet to the other edge device, using the packet's destination IP address (e.g., IP address of the destination customer subnet or endpoint in the destination customer subnet). The edge device is configured to use key(s) (e.g., group keys or crypto keys) associated with the SA to encrypt the packet and produce an encrypted packet. The edge device also inserts the SPI associated with the SA into the IPsec protocol header (e.g., ESP header) of the encrypted packet.

The process then continues to operation 635, where the edge device selects a VRF table used to forward the packet. In another embodiment, operation 635 is optional since a standard routing table can be implemented for packet forwarding. A VRF table can be selected from among one or more VRF tables configured on the edge device, where each VRF table has been created for a customer VPN (or VLAN) coupled to the edge device. Since each customer VPN (or VLAN) is associated with a VRF table, a VRF table can be selected using an identifier associated with the packet. In one embodiment, if each customer-facing interface (or VLAN-facing interface) of the edge device is associated with a different (single) customer VPN (or VLAN), VRF table selection can be based on an interface identifier of the interface on which the packet is received (e.g., an IP address or port number identifying the customer-facing interface or VLAN-facing interface on which the packet is received). The VRF table that is associated with the interface identifier is selected for packet forwarding.

In another embodiment, if a customer-facing interface is associated with multiple VPNs of a customer (e.g., the customer-facing interface is coupled to two or more subnets of the customer, where the two or more subnets are part of two or more customer VPNs), an additional VRF selection table can be used to select the VRF table used for packet forwarding. As the provider edge device learns about (or is configured with information about) a particular customer VPN, a VRF table of the particular customer VPN can be associated with a source IP address that identifies the particular customer VPN (such as a source IP address of a local customer subnet in the particular customer VPN) in the VRF selection table. Thus, a source IP address of the packet (which can indicate the source customer subnet of the packet) can be used as an index into the VRF selection table. A matching VRF selection table entry (e.g., the packet's source IP address matches the entry's source IP address) indicates a VRF table that should be used to forward packets of the customer subnet to a destination customer subnet. Thus, the VRF table that is associated with the source IP address of the packet can be selected for packet forwarding.

The process continues to operation 640, where the edge device determines the forwarding information for the packet from the selected VRF table. In another embodiment, a standard routing table can be used to determine the forwarding information. If the packet is going to be transmitted across an MPLS network, the VRF table can include a forwarding label that indicates the next hop device in the network to which the packet should be forwarded. The VRF table can also be associated with a VPN label that identifies the customer VPN. The VPN label and forwarding label can be appended to the packet, as shown in FIG. 4. The VRF table also includes an identifier of an output interface of the provider edge device from which the packet can be transmitted to the provider network, or in other words, an identifier of a network-facing interface.

The process continues to operation 645, where the edge device transmits the packet on the network-facing interface (e.g., the output interface identified in the VRF table or standard routing table). The packet can be transmitted in the encrypted format illustrated in FIG. 4, and can be transmitted across the network to the destination (e.g., customer subnet or VLAN portion). If the network is an MPLS network, the packet can be label switched across the network to the destination subnet. The network-facing interface can be a physical interface, such as a port, or can be a logical interface, such as a virtual port associated with a physical interface. The process then ends.

Figure 7:
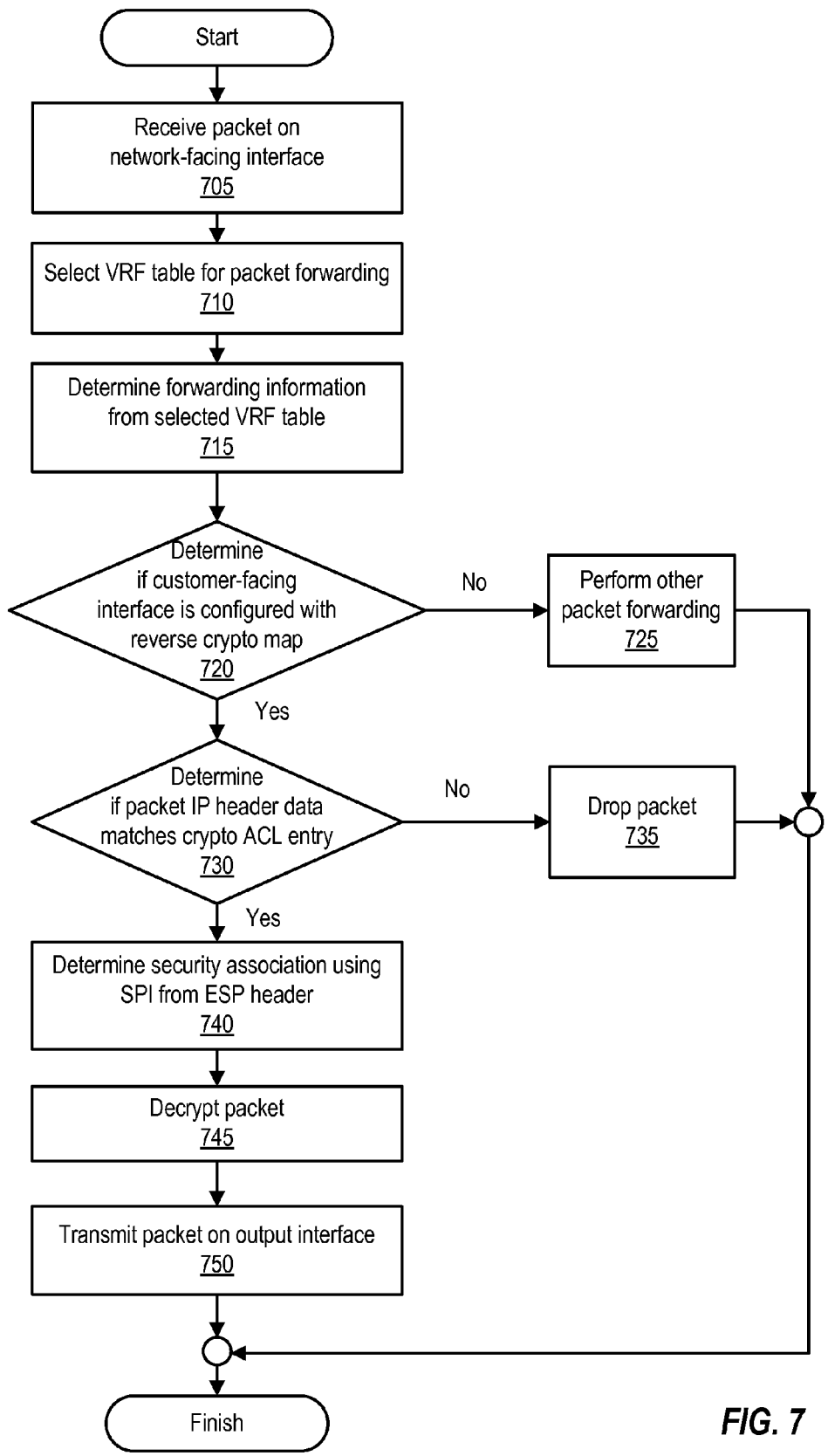
FIG. 7 is a flowchart illustrating operations of an example egress transmission process implemented by an edge device, according to one embodiment.

FIG. 7 is a flowchart illustrating operations of an example egress transmission process implemented by an edge device 130. As shown in FIG. 2, a packet follows an egress transmission path as the packet leaves customer-facing interface 230 toward customer device interface 220. An example egress transmission path can also be seen in FIG. 1A from provider edge device 130(2) to customer edge device 120(4), which can be part of the transmission path from subnet 150(1) to subnet 150(2). Another example egress transmission path can be seen in FIG. 1B from customer edge device 130(20) to VOIP VLAN 155(2), which can be part of the transmission path from VOIP VLAN 155(1) to 155(2).

The process illustrated in FIG. 7 begins at operation 705, receiving a packet on a network-facing interface of the edge device that is coupled to the network. The network-facing interface can be a physical interface, such as a port, or can be a logical interface, such as a virtual port associated with a physical interface. The packet is an encrypted packet received from the network, which can be in the encrypted format illustrated in FIG. 4.

The process continues to operation 710, where the edge device selects a VRF table used to forward the packet. In another embodiment, operation 710 is optional since a standard routing table can be implemented for packet forwarding. An identifier of the destination (e.g., customer VPN or VLAN) can be extracted from the packet and used to select the VRF table that is associated with the destination. For example, if the encrypted packet has a VPN label (or VLAN label) that identifies the customer VPN (or VLAN), the VRF table associated with the label can be selected. Once the VRF table is selected, the process continues to operation 715, where the edge device determines the forwarding information for the packet from the selected VRF table. In another embodiment, operation 715 determines the forwarding information from the routing table. The forwarding information can indicate how the packet should be forwarded to the destination (e.g., customer VPN or VLAN). For example, the VRF table can include an identifier of an output interface of the edge device from which the packet can be transmitted to the destination (in other words, an identifier of a customer-facing interface of the edge device).

The process continues to operation 720, where the edge device determines whether the customer-facing interface or VLAN-facing interface (e.g., the output interface identified in the VRF table or other routing table) is configured with a reverse crypto map. For example, a reverse crypto map identifier that is associated with the customer-facing interface (or VLAN-facing interface) indicates that a reverse crypto map is applied to, or configured on, the interface. If the customer-facing interface (or VLAN-facing interface) is not configured with a reverse crypto map, the process continues to operation 725, where the edge device performs other packet forwarding. Since a reverse crypto map is not configured on the customer-facing interface, another forwarding scheme is used by the edge device to forward the packet that was received on the network-facing interface. For example, in a provider environment like that shown in FIG. 1A, a classic crypto map is configured on a customer edge device coupled to the customer-facing interface, where the forwarding scheme indicates that a receive packet need to be forwarded according to the packet's IP header (e.g., the edge device should forward the packet to a customer edge device). In one embodiment, such a forwarding scheme can include dropping all packets (or forwarding packets in the clear) that are destined for the customer-facing interface or VLAN-facing interface. The process then ends.

Returning to operation 720, if the customer-facing interface is configured with a reverse crypto map, the process continues to operation 730, where the edge device determines if the packet IP header data matches a crypto ACL entry of the reverse crypto map. The packet's IP header includes a source IP address and a destination IP address, which is compared to the origination and destination points (e.g., IP addresses or network prefixes) of the entries in the crypto ACL (also referred to as an ACL entry or an ACE) of the reverse crypto map that is applied to, or configured on, the interface. If the packet's source IP address and destination IP address do not match any ACEs, the process continues to operation 735, where the edge drops the packet. In one embodiment, operation 735 can include forwarding the packet according to the packet's IP header. The process then ends.

Returning to operation 730, if the packet's source and destination IP addresses match an ACE's origination and destination points (e.g., IP addresses or network prefixes), the process continues to operation 740, where the edge device determines the security association using the SPI from the packet's ESP header. The edge device can extract the SPI from the packet's ESP header, and can use the SPI, the packet's destination IP address, and IPsec protocol (in this example, ESP) to lookup the SA parameters of the security association used to encrypt the packet from the security association database. Once the security association is found, the process continues to operation 745, where the edge device decrypts the packet. Edge device can use group key(s) or other crypto key(s) associated with the security association to decrypt the packet and produce a decrypted packet (e.g., a clear text packet).

The process continues to operation 750, where the edge device transmits the clear text packet on the customer-facing interface (e.g., the output interface identified in the VRF table or routing table). Since the packet's IP header data matches an ACE, the packet is determined to be part of the customer traffic flow that is protected by the edge device (e.g., C1 VPN traffic flow that is protected by a provider edge device), and thus should be transmitted toward the destination (e.g., customer subnet or VLAN) via the customer-facing interface (or VLAN-facing interface). The customer-facing interface is communicatively coupled to the destination (e.g., coupled to a customer edge device that in turn is coupled to the destination customer subnet, or to a customer device of the VLAN). The customer-facing interface can be a physical interface, such as a port, or can be a logical interface, such as a virtual port associated with a physical interface. In one embodiment, the packet is transmitted as a clear text packet. The process then ends.

In another scenario, a provider edge device (e.g. a VPN gateway) can be coupled to different security domains that implement different VPN protocols, where traffic (e.g., a customer's VPN traffic flow) needs to be protected from one security domain into another security domain. For example, the provider edge device can be coupled to a first interface of a first network device of a first security domain implementing an overlay crypto VPN (e.g., EasyVPN, FlexVPN, or Dynamic Multipoint VPN (DMVPN)). The provider edge device can also be coupled to a second interface of a second network device of a second security domain implementing GET VPN.

For example, the provider edge device can receive a first packet (e.g., a packet protected by overlay VPN) on a first-domain-facing interface (e.g., the packet is received on an interface facing the overlay VPN domain), where the first packet needs to be transmitted to the GET VPN domain. The packet is received via an encrypted point-to-point tunnel spanning the overlay VPN domain from a source customer device to the provider edge device, and thus the packet can be forwarded to a tunnel interface configured on the provider edge device, where the tunnel terminates at the tunnel interface. The provider edge device can be configured to decrypt, validate, and decapsulate the packet at the tunnel interface. A reverse crypto map can be applied to (configured on) the tunnel interface, where the reverse crypto map can be used to select a corresponding GET crypto map for the customer. Using information from the packet and the corresponding GET crypto map (in a manner as described above with respect to FIG. 6, such as operations 620-645), the provider device can then protect the (decrypted) packet using GET VPN (e.g., encrypt the packet using an SA) and transmit the protected packet to the second domain according to information in the corresponding GET crypto map (e.g., transmit the packet via the second-domain-facing interface).

In the reverse direction, the provider edge device can receive a second packet (e.g., a packet protected by GET VPN) on the second-domain-facing interface (e.g., the packet is received on an interface facing the GET VPN domain), where the second packet needs to be transmitted to the overlay VPN domain. The provider edge device can be configured to decrypt, validate, and decapsulate the packet at the second-domain-facing interface (e.g., decrypt the packet using the SA). The provider edge device can determine that packet should be forwarded to the tunnel interface, which is configured with a reverse crypto map. The provider edge device can then protect the (decrypted) packet using the overlay VPN (e.g., use an encrypted point-to-point tunnel from the provider edge device to a destination customer device) and transmit the protected packet to the first domain according to information in the reverse crypto map (e.g., transmit the packet via the first-domain-facing interface).

Also, the provider edge device can interpret that since the tunnel interface is configured with the reverse crypto map, then the packet needs to be decrypted and immediately re-encrypted without leaving the cryptographic engine of the provider edge device, thus translating the packet using cryptographic protocol translators to function without exposing the packet in the clear.

Figure 8:
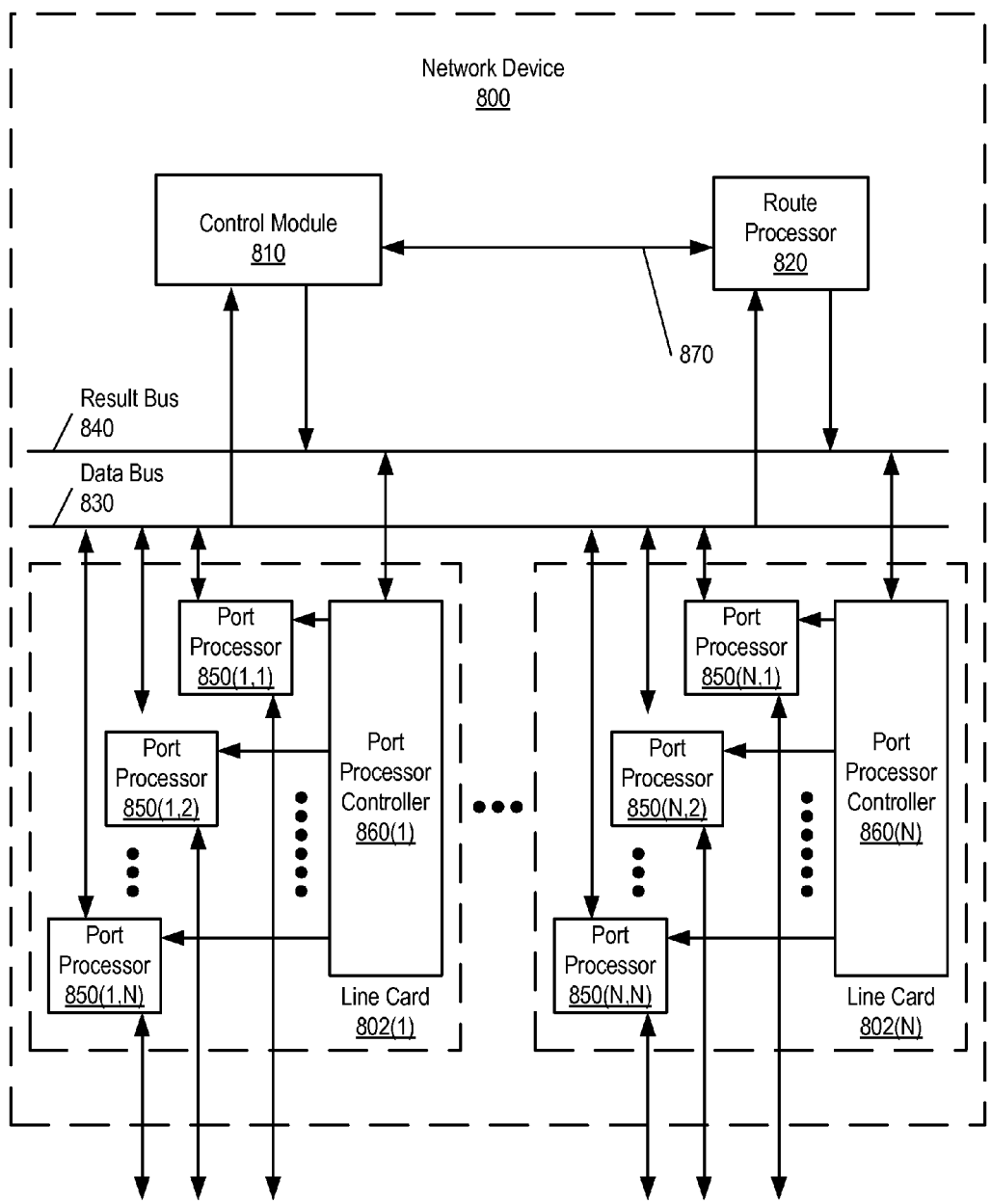
FIG. 8 is a block diagram illustrating relevant components of an example network device in which the present disclosure can be implemented, according to one embodiment.

FIG. 8 is a block diagram illustrating relevant components of an example network device 800 (e.g., provider edge devices 130(1) and 130(2) of FIG. 1A and customer edge devices 130(3) and 130(4) of FIG. 1B) in which the present disclosure can be implemented. In this depiction, network device 800 includes a number of line cards (line cards 802(1)-802(N)) that are communicatively coupled to a control module 810 (which can include a forwarding engine, not shown) and a route processor 820 via a data bus 830 and a result bus 840. Line cards 802(1)-(N) include a number of port processors 850(1,1)-850(N,N) which are controlled by port processor controllers 860(1)-860(N). It will also be noted that control module 810 and route processor 820 are not only coupled to one another via data bus 830 and result bus 840, but are also communicatively coupled to one another by a communications link 870. In alternative embodiments, each line card can include its own forwarding engine.

When a message (e.g., a clear text packet and/or an encrypted packet with appended labels) is received, the message is identified and analyzed by a network device such as network device 800 in the following manner. Upon receipt, a message (or some or all of its control information) is sent from one of the port processors 850(1,1)-850(N,N) at which the message was received to one or more of those devices coupled to data bus 830 (e.g., others of port processors 850(1,1)-850(N,N), a forwarding engine, and/or route processor 820). Handling of the message can be determined, for example, by a forwarding engine. For example, a forwarding engine may determine that the message should be forwarded to one or more of port processors 850(1,1)-850(N,N). This can be accomplished by indicating to corresponding one(s) of port processor controllers 860(1)-860(N) that the copy of the message held in the given one(s) of port processors 850(1,1)-850(N,N) should be forwarded to the appropriate one of port processors 850(1,1)-850(N,N).

Network device 800 can be configured as a group member, and thus is configured with an encryption module 310 and a security association database 320 (e.g., in control module 810, or in one of port processor controllers 860(1)-860(N)

and/or in route processor 820) in order to implement the present disclosure, such as to configure the network device 800 with information from a key server and/or to process packets received from a coupled customer edge device 120 or from a coupled provider network 105 (e.g., an MPLS network). Network device 800 can thus implement the processes illustrated in FIGS. 5, 6, and 7. A network device 800 within provider network 105, such as core routing elements in the provider network, need not be configured to implement the present disclosure. A network device 800 within a customer subnet coupled to the provider network, such as customer edge elements 120, also need not be configured to implement the present disclosure.

Network device 800 can also be configured with a VRF table 340, a reverse crypto map 240, and a crypto ACL 330 (e.g., in control module 810, or in one of port processor controllers 860(1)-860(N) and/or in route processor 820), which can be used to forward packets.

Figure 9:
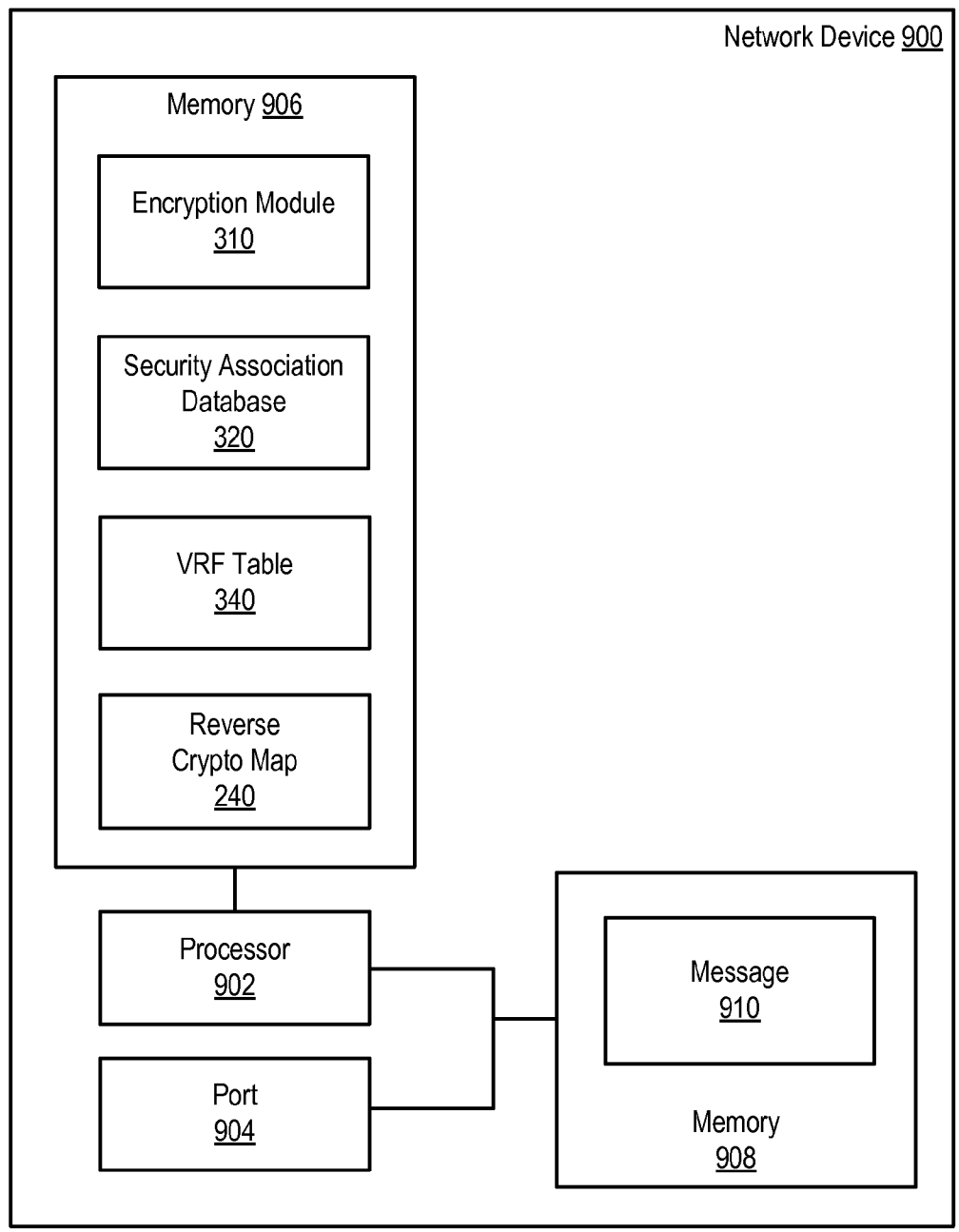
FIG. 9 is a block diagram illustrating components of an example network device in which the present disclosure can be implemented, which illustrates how the present disclosure can be implemented in software, according to one embodiment.

FIG. 9 is a block diagram illustrating relevant components of an example network device, illustrating how an encryption module 310, security association database 320, VRF table 240, and reverse crypto map 240 (including crypto ACL 330) can be implemented in software. As illustrated, network device 900 includes one or more processors 902 (e.g., microprocessors, PLDs (Programmable Logic Devices), or ASICs (Application Specific Integrated Circuits)) configured to execute program instructions stored in memories 906 and/or 908. Memories 906 and 908 can include various types of RAM (Random Access Memory), ROM (Read Only Memory), Flash memory, MEMS (Micro Electro-Mechanical Systems) memory, and the like. Network device 900 also includes one or more ports 904 (e.g., one or more hardware ports or other network interfaces that can be linked to other network devices, hosts, servers, storage devices, or the like). Processor 902, port 904, and memories 906 and 908 are coupled to send and receive data and control signals by one or more buses or other interconnects.

In this example, program instructions executable to implement an encryption module 310 are stored in memory 906. Encryption module 310 includes the functionality needed to perform the processes illustrated in FIGS. 5, 6, and 7. Security association database 320, VRF table 340, and reverse crypto map 240 (including crypto ACL 330) can be stored in memory 906.

Various messages like message 910, including messages like a clear text packet and/or an encrypted packet with appended labels can be stored in memory 908. Other messages can also be stored in memory 908. These messages can be stored in memory 908 prior to being sent on port 904 (e.g., sent to provider network 105 or to customer edge device 120) and/or in response to being received from port 904 (e.g., received from provider network 105 or from customer edge device 120).

The program instructions and/or data executable to implement encryption module 310 can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present disclosure has been described with respect to specific embodiments thereof, various changes and modifications may be suggested to one skilled in the art. It is intended such changes and modifications fall within the scope of the appended claims.

What is claimed is:

1. A method comprising:
   receiving a packet at a first interface of an edge device;
   determining whether the first interface is configured with a reverse cryptographic map, wherein
      the reverse cryptographic map is based on a cryptographic map,
      the reverse cryptographic map is not the same as the cryptographic map,
      the reverse cryptographic map is configured to identify one or more traffic flows that are protected by the edge device; and
   in response to a first determination that the first interface is configured with the reverse cryptographic map, determining whether the packet is protected by the edge device;
   a second interface performing a first operation, using the cryptographic map, on packets transmitted in an ingress transmission path direction into the second interface;
   the second interface performing a second operation, using the cryptographic map, on packets transmitted in an egress transmission path direction out of the second interface;
   the first interface performing the first operation, using the reverse cryptographic map, on packets transmitted in an egress transmission path direction out of the first interface; and
   the first interface performing the second operation, using the reverse cryptographic map, on packets transmitted in an ingress transmission path direction into the first interface.

2. The method of claim 1, further comprising:
   in response to the determination that the packet is protected by the edge device,
      encrypting the packet, wherein
         the encrypting produces an encrypted packet; and
   transmitting the encrypted packet on a second interface of the edge device, wherein
      the second interface is coupled to a network.

3. The method of claim 2, further comprising:
   encapsulating the encrypted packet with an IPsec (Internet Protocol security) header.

4. The method of claim 1, further comprising:
   decrypting the packet, wherein
      the decrypting produces a decrypted packet.

5. The method of claim 4, further comprising:
   extracting a security parameter index (SPI) from an IPsec (Internet Protocol security) header of the packet, wherein
      the SPI is used to identify a set of security association (SA) parameters associated with a first security association,
      the first security association is formed between the edge device and another edge device.

6. The method of claim 1, further comprising:
   selecting a virtual routing and forwarding (VRF) table, wherein
      the VRF table is selected based on an identifier associated with the packet; and forwarding the packet based on information in the VRF table.

7. The method of claim 1, wherein the determining whether the first interface is configured with a reverse cryptographic map further comprises:
   determining whether a reverse cryptographic map identifier is associated with the first interface.

8. The method of claim 1, wherein
   the reverse cryptographic map is configured with a cryptographic ACL (access control list),
   the cryptographic ACL comprises a plurality of entries, and
   each entry comprises information describing a protected traffic flow.

9. The method of claim 8, wherein the determining whether the packet is protected by the edge device further comprises:
   determining whether IP (Internet Protocol) header data of the packet matches an entry of the cryptographic ACL.

10. The method of claim 1, wherein:
    the ingress transmission path direction into the second interface is in the same direction as the egress transmission path direction out of the first interface, and
    the egress transmission path direction out of the second interface is in the same direction as the ingress transmission path direction into the first interface.

11. A system comprising:
    a network; and
    a edge device coupled to the network, the edge device comprising:
    a first interface configured to receive a packet; and
    an encryption module, wherein
       the encryption module is configured to
          determine whether the first interface is configured with a reverse cryptographic map, wherein
             the reverse cryptographic map is based on a cryptographic map,
             the reverse cryptographic map is not the same as the cryptographic map,
             the reverse cryptographic map is configured to identify one or more traffic flows that are protected by the edge device, and
          determine whether the packet is protected by the edge device, in response to a first determination that the first interface is configured with the reverse cryptographic map, and
          a second interface is configured to perform a first operation, using the cryptographic map, on packets transmitted in an ingress transmission path direction into the second interface;
          the second interface is configured to perform a second operation, using the cryptographic map, on packets transmitted in an egress transmission path direction out of the second interface;
          the first interface is configured to perform the first operation, using the reverse cryptographic map, on packets transmitted in an egress transmission path direction out of the first interface; and
          the first interface is configured to perform the second operation, using the reverse cryptographic map, on packets transmitted in an ingress transmission path direction into the first interface.

12. The system of claim 11, wherein
    the encryption module is further configured to
       encrypt the packet to produce an encrypted packet, in response to the determination that the packet is protected by the edge device.

13. The system of claim 12, wherein
    the encryption module is further configured to
       encapsulate the encrypted packet with an IPsec (Internet Protocol security) header.

14. The system of claim 11, wherein
    the encryption module is further configured to
       decrypt the packet to produce a decrypted packet, and
    the edge device further comprises a second interface configured to transmit the
       decrypted packet, wherein
       the second interface is coupled to a customer device.

15. The system of claim 14, wherein
    the encryption module is further configured to
       extract a security parameter index (SPI) from an IPsec (Internet Protocol security) header of the packet, wherein
          the SPI is used to identify a set of security association (SA) parameters associated with a first security association,
          the first security association is formed between the edge device and another edge device.

16. The system of claim 11, wherein
    the encryption module is further configured to
       select a virtual routing and forwarding (VRF) table, wherein
          the VRF table is selected based on an identifier associated with the packet, and
       forward the packet based on information in the VRF table.

17. The system of claim 11, wherein
    the reverse cryptographic map is configured with a cryptographic ACL (access control list),
    the cryptographic map comprises a plurality of entries, and
    each of the plurality of entries comprises information describing a protected traffic flow.

18. The system of claim 17, wherein
    the encryption module is further configured to
       determine whether a reverse cryptographic map identifier is associated with the first interface, and
       determine whether IP (Internet Protocol) header data of the packet matches an entry of the cryptographic ACL.

19. An edge device comprising:
    a first interface;
    an encryption module configured to implement packet encryption; and
    a reverse cryptographic map configured to indicate one or more traffic flows that are protected by packet encryption, wherein
       the reverse cryptographic map is based on a cryptographic map,
       the reverse cryptographic map is not the same as the cryptographic map,
       a second interface is configured to perform a first operation, using the cryptographic map, on packets transmitted in an ingress transmission path direction into the second interface;
       the second interface is configured to perform a second operation, using the cryptographic map, on packets transmitted in an egress transmission path direction out of the second interface;
       the first interface is configured to perform the first operation, using the reverse cryptographic map, on packets transmitted in an egress transmission path direction out of the first interface; and
       the first interface is configured to perform the second operation, using the reverse cryptographic map, on packets transmitted in an ingress transmission path direction into the first interface.

20. The edge device of claim 19, wherein the reverse cryptographic map is configured on the first interface.

21. The edge device of claim 19, wherein
the encryption module is configured to perform packet encryption according to the reverse cryptographic map.

* * * * *